United States Patent
Godfrey

[15] 3,666,721

[45] May 30, 1972

[54] POLYAMINE AND HYDROCARBON SULFONIC ACID ACCELERATOR COMBINATION FOR EPOXY CURING

[72] Inventor: Norman Bell Godfrey, Austin, Tex.

[73] Assignee: Jefferson Chemical Company, Inc., Houston, Tex.

[22] Filed: Oct. 13, 1970

[21] Appl. No.: 80,510

[52] U.S. Cl. ............................................. 260/47 EC
[51] Int. Cl. ........................................... C08f 30/14
[58] Field of Search ............... 260/47 EC, 2 EC, 18 EC, 59

[56] References Cited

UNITED STATES PATENTS

| | | | |
|---|---|---|---|
| 3,236,895 | 2/1966 | Lee et al. | 260/2 |
| 2,643,243 | 6/1953 | Dannenberg | 260/47 |
| 2,965,609 | 12/1960 | Newey | 260/47 |
| 3,510,339 | 5/1970 | Will | 260/47 |

OTHER PUBLICATIONS

J. Oil Coulour Chemist Assoc. Vol. 43 Gough & Smith pp. 409– 418 1960

Lee & Neville pg. 10– 12 (only 1 page) Handbook of Epoxy Resins 1967

Primary Examiner—William H. Short
Assistant Examiner—T. Pertilla
Attorney—John R. Kirk, Jr., H. G. Jackson and Terrence D. Dreyer

[57] ABSTRACT

An accelerator combination of a polyamine and an organic sulfonic acid is synergistic for accelerating the cure of a polyglycidyl ether of a polyhydric phenol cured with a polyoxypropylenepolyamine. The epoxy resin product is useful in castings, coatings, adhesives, laminates, filament reinforced compositions, seamless flooring, terrazzo flooring, crushed-stone aggregates and in grouting, caulking and sealing compositions.

9 Claims, No Drawings

POLYAMINE AND HYDROCARBON SULFONIC ACID ACCELERATOR COMBINATION FOR EPOXY CURING

BACKGROUND OF THE INVENTION

1. Field of the Invention

The invention pertains to an improved method for making a cured epoxy resin.

2. Description of the Prior Art

Lee, Henry, and Neville, Kris, *Handbook of Epoxy Resins*, McGraw-Hill Book Co., N.Y., 1967, p. 10–5, teach the use of p-toluenesulfonic acid as an accelerator with amidopolyamides for epoxy curing. Lee and Neville also teach in chapters 7–9 the use of various amines as curing agents. Bobby Legler's U.S. Pat. No. 3,462,393 (Aug. 19, 1969) teaches cured epoxy resin products prepared by admixing a polyoxyalkylenepolyamine with a polyglycidyl ether of a phenolic compound.

In many applications of epoxy resins, room temperature cures are not only convenient but sometimes necessary. Curing epoxy resins with polyoxypropylenepolyamines is inconveniently slow at ambient temperatures. The known accelerators are still too slow for many applications requiring room temperature cures. By using an accelerator combination of my invention with a polyoxyalkylenepolyamine, room temperature cures of epoxy resins can be completed in a practical, short period of time.

SUMMARY OF THE INVENTION

The invention is an improvement in curing an epoxy resin comprised of a mixture of a polyglycidyl ether of a polyhydric phenol and a polyoxypropylenepolyamine. The improvement is the use in the mixture of an accelerator combination of an organic sulfonic acid and a polyamine for example an N-(aminoalkyl) piperazine or a polyalkylenepolyamine.

DESCRIPTION OF THE PREFERRED EMBODIMENTS

The invention is a process for preparing a self-curing epoxy resin composition of (1) a polyglycidyl ether of a polyhydric phenol, (2) a polyoxypropylenepolyamine having a molecular weight in the range from about 190 to about 1,200, (3) a hydrocarbon sulfonic acid, for example, lower alkanesulfonic acid or arenesulfonic acid, and (4) a polyamine, for example, a polyalkylenepolyamine or an N-(aminoalkyl) piperazine: and the cured compositions obtained in the process. Preferred examples of (1) are the diglycidyl ether of isopropylidenediphenol and its congeners. Preferred examples of (2) are polyoxypropyleneamines of the formula (A)

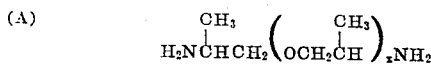

where $x = 2$ to $20$ and triamines having the formula (B)

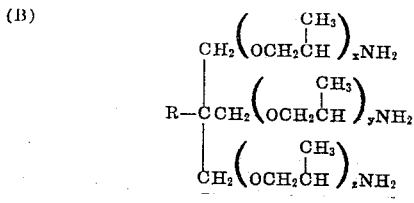

where R is lower alkyl and $x + y + z$ equals 3 to 20.

Preferred examples of (3) include methanesulfonic acid, ethanesulfonic acid, p-toluenesulfonic acid, o-toluenesulfonic acid and mixed xylenesulfonic acids. Preferred examples of (4) include diethylenetriamine, triethylenetetramine, tetraethylenepentamine, N-(2-aminoethyl) piperazine and N-(3-aminopropyl) piperazine.

The order of mixing is not critical to the practice of the invention, but a preferred order is to dissolve (3) the sulfonic acid in (2) the polyoxypropylenepolyamine followed by addition of (4) the polyamine; then add the resulting mixture to (1) the polyglycidyl ether of a polyhydric phenol. The equivalent weight of the combination of (2), (3) and (4), supra, may be calculated on the basis of the number of equivalents of primary and secondary amino hydrogens contained in (2) and (4): the acid hydrogen in (3), the sulfonic acid, being considered as unreactive for this purpose. One equivalent of the mixture of (2), (3) and (4) per equivalent of (1), the polyglycidyl ether of a polyhydric phenol, is in general the optimum proportion and effective amount for compounding the finished product; however variations within limits of about 25 percent above and below this ratio are operable and effective amounts for the practice of the invention. The curing temperature range of the invention are ambient temperatures from about 0° C to about 45° C. Post cures at temperatures up to about 200° C. are optional.

The cured epoxy resins of the invention are useful in castings, coatings, adhesives, laminates, filament-reinforced composites, seamless flooring, terrazzo flooring, crushed-stone aggregates and in grouting, caulking and sealing compositions.

The following Tables illustrate the invention in more detail but are not to be construed as limitative. In Table I, 200 g. of a diglycidyl ether of isopropylidenediphenol of an equivalent weight of approximately 143 was used. The basic formulation used for preparing the epoxy resins illustrated in Table I is as follows:

FORMULATION

| | |
|---|---|
| 200 g | Diglycidyl Ether of Isopropylidene Diphenol |
| 86 g | Polyoxypropylenediamine Having a Molecular Weight of Approximately 400 (D-400) |

As shown Accelerator Component

In each example in Table I, the accelerator components were mixed with the polyoxypropylenediamine prior to mixing with the ether. The well-stirred entire mixture was poured into a one-pint paint can and allowed to stand until the mass hardened. The gel time reported in the Table is the elapsed time between completion of mixing and the first indication of hardening.

TABLE I

| Example number | D-400, g. | MSA a | TSA b | AEP c | Gel times, minutes |
|---|---|---|---|---|---|
| 1 | 86 | | | | >720 |
| 2 | 86 | 3.03 | | | >360 |
| 3 | 86 | | | 7.0 | >360 |
| 4 | 86 | 3.03 | | 7.0 | 40 |
| 5 | 86 | | 3.0 | | 166 |
| 6 | 86 | | 3.0 | 7.0 | 61 | a Methanesulfonic acid.
b p-toluenesulfonic acid monohydrate.
c N-(2-aminoethyl)piperazine.

In example 4 of Table I, the methanesulfonic acid was first mixed with the polyoxypropylenediamine and the N-(2-aminoethyl)piperazine was added. A clear, colorless liquid was obtained. The strongly synergistic effect of the sulfonic acid-polyamine combination of the invention is illustrated by the gel times reported in Examples 4 and 6 of Table I.

In the examples of Table II, approximately 1-pound masses of epoxy resin compositions were mixed at an ambient temperature of about 26° C., and the times required to cure spontaneously to the gel stage were recorded. The heading "D-230" in the Table is a polyoxypropylenediamine of the structure (A), supra, with an equivalent weight of about 58. The heading "T-403" in the Table is a polyoxypropylenetriamine of structure (B), supra, where R is ethyl with an equivalent weight of about 80. In Table II, a diglycidyl ether of isopropylidene-diphenol of an equivalent weight of approximately 193 was used.

TABLE II

| Ex. No. | Ether, g. | D-230, g. | T-403 | APP [a] | AEP [b] | DETA [c] | MSA [d] | Gel time, minutes |
|---|---|---|---|---|---|---|---|---|
| 7 | 349 | 105 | | | | | | 178 |
| 8 | 349 | 105 | | | | | 3.5 | 53 |
| 9 | 349 | 90 | | | 7.3 | | 3.2 | 35 |
| 10 | 349 | 95 | | | 7.7 | | 3.4 | 30.5 |
| 11 | 349 | 100 | | | 8.1 | | 3.5 | 27.5 |
| 12 | 359 | 88 | | | | 7.1 | | 109 |
| 13 | 359 | 88 | | | | 7.1 | 2.4 | 33 |
| 14 | 321 | | 133 | | | | | 188 |
| 15 | 50 | | 18 | | 1.44 | | 6.3 | 50 |
| 16 | 349 | 94.9 | | 7.73 | | | 3.37 | 34 |

[a] N(3-aminopropyl) piperazine.
[b] N(2-aminoethyl) piperazine.
[c] Diethylenetriamine.
[d] Methanesulfonic acid.

The strong synergistic effect of the sulfonic acid-polyamine combination is again illustrated by the gel times of Examples 9, 10, 11, 13, 15, and 16.

The following examples illustrate the synergistic effect of the accelerator combinations of the invention when the epoxy resins are used as surface coatings.

EXAMPLE 18 p-Toluenesulfonic acid monohydrate (4 g) and N(2-aminoethyl)piperazine (10 g) were dissolved in 46.7 g of polyoxypropylenediamine having a molecular weight of approximately 400 13.5 g of this mixture, 25 parts of a diglycidyl ether of isopropylidenediphenol having an equivalent weight of 186 and 0.5 parts of a silicone-type flow control agent were formulated into a clear epoxy varnish. The varnish was spread on a steel test panel with a 6-mil applicator blade and allowed to cure at ambient temperature. After 22 hours the coating had a Sward hardness (ASTM Designation D 2134-66) rating of 66 and absorbed 160 in-lb. of reverse impact on a Gardner impact strength tester without visible damage. The Gardner tester is described by Gardner and Sward in *Paint Testing Manual*, 12th Ed., Gardner Laboratory, Inc., Bethesda, Md., p. 147 (1962).

A similar test was run on a coating cured with the stoichiometric amount of the same polyoxypropylenediamine in the absence of an accelerator of the invention. After 22 hours the coating was too soft to test. After 4 days the coating had attained a Sward hardness of only 36.

EXAMPLE 19

A surface-coating composition was formulated from 25 g of diglycidyl ether of isopropylidene-diphenol with an equivalent weight of approximately 193, 10 g polyoxypropylenediamine having a molecular weight of approximately 400, 0.4 g methanesulfonic acid (70 percent industrial grade) 1.7 g N-(2-aminoethyl)-piperazine and 0.5 g flow control agent. A 6-mil coating on steel cured set-to-touch in 5.4 hours and through-dry in 4.7 hours. The Sward hardness rating reached 28 in 22 hours and 66 in 3 days at ambient temperature. The coating absorbed a reverse impact of 120 in-lb. without rupturing or separating from the substrate.

Comparable results to those illustrated in the Tables and Examples, supra, are obtained using accelerator combinations within the invention disclosed but not specifically illustrated.

I claim:

1. A process for accelerating the curing of a polyglycidyl ether of a polyhydric phenol wherein a curing agent of polyoxypropylenepolyamine is admixed therewith which comprises: admixing therewith an effective amount of an accelerator combination of a hydrocarbon sulfonic acid and a polyamine of an N-(aminoalkyl)piperazine or a polyalkylenepolyamine.

2. A process according to claim 1 wherein the hydrocarbon sulfonic acid is a lower alkanesulfonic acid or an arenesulfonic acid and the polyamine is N-(2-aminoethyl)-piperazine, N-(3-aminopropyl)piperazine, diethylenetriamine, triethylenetetramine or tetraethylenepentamine.

3. A process according to claim 2 wherein the hydrocarbon sulfonic acid is methanesulfonic acid, ethanesulfonic acid, p-toluenesulfonic acid, o-toluenesulfonic acid or mixed xylenesulfonic acids.

4. A process according to claim 3 wherein the accelerator combination is N-(2-aminoethyl)piperazine and methanesulfonic acid.

5. A process according to claim 3 wherein the accelerator combination is N-(2-aminoethyl)piperazine and p-toluenesulfonic acid.

6. A process according to claim 3 wherein the accelerator combination is N-(3-aminopropyl)piperazine and methanesulfonic acid.

7. A process according to claim 3 wherein the accelerator combination is N-(3-aminopropyl)piperazine and p-toluenesulfonic acid.

8. A process according to claim 3 wherein the accelerator combination is diethylenetriamine and methanesulfonic acid.

9. A process according to claim 3 wherein the accelerator combination is diethylenetriamine and p-toluenesulfonic acid.

* * * * *